Patented Oct. 22, 1940

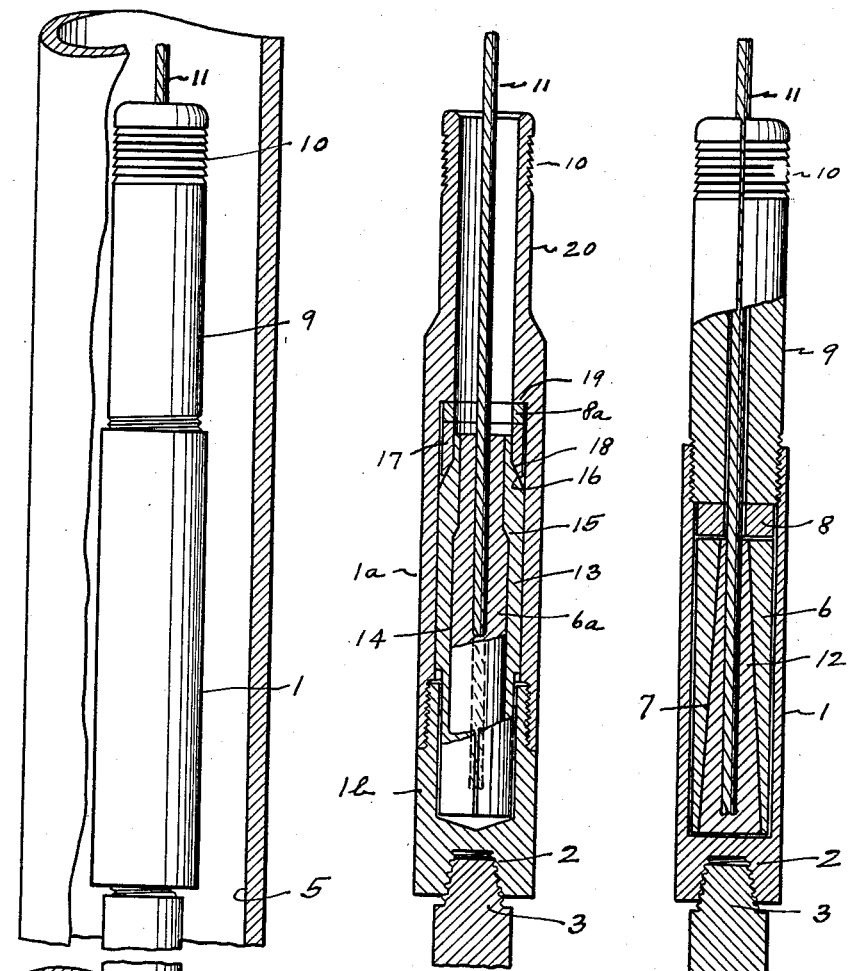

2,219,151

UNITED STATES PATENT OFFICE 2,219,151

CABLE SOCKET

Fred N. Osmun, Houston, Tex.

Application March 17, 1938, Serial No. 196,377

1 Claim. (Cl. 255—26)

This invention relates to a cable socket.

It is an object of the invention to provide a cable socket by means of which a cable, or operating line, may be attached to a swab, or other tool, in a well and which is of such construction that it may be removed in whole or at least in part from the cable when it is desired to remove the cable from the crown block sheaves or other sheaves over which the cable operates and then re-attached to the cable for successive use.

At the present time in the use of an operating cable when it is desired to detach the cable from the operated tool and to remove the cable from the sheaves over which it operates, as for example when it is desired upon completion of a job to move to another, the cable socket, employed for attaching the cable to the tool to be operated, is detached from the tool and the cable is severed to detach the socket therefrom for the reason that the socket will not pass through the sheaves and, if attached to the cable, the cable can not be detached from the sheaves. This necessitates the attaching of a new socket to the end of the cable when it is desired to again use the cable for carrying on the work.

It is an object of this invention to provide a novel type of socket that may be wholly or at least in part removed from the cable so that the cable will pass through the sheaves and the socket is of such construction that the removed parts may be readily re-attached to, or reassembled on, the cable without the necessity of severing the cable or loss of material or parts, thus greatly facilitating the work.

With the above and other objects in view, the invention has particular relation to certain novel features of construction and arrangement of parts and use, examples of which are given in this specification and illustrated in the accompanying drawing, wherein:

Figure 1 shows a side elevational view of the socket attached to the cable and to the tool to be operated.

Figure 2 shows a side elevation thereof partly in section, taken at right angles to the view shown in Figure 1, and Figure 3 shows a longitudinal sectional view of another embodiment.

Referring now more particularly to the drawing wherein like numerals of reference designate the same parts in each of the figures, the numeral 1 designtes an outer tubular jacket whose lower end is formed with an internally threaded box 2 to receive the externally threaded pin 3 of the tool 4 to be operated. In the present instance this tool is a swab, to be operated in the well casing 5, although the socket is adapted to be attached to any type of well tool to be operated in the well.

Fitted within the shell 1 there is the nipple 6 of a cylindrical external contour and which is provided with the internal downwardly flared bore 7. Fitted loosely in the jacket above said nipple there is an annular antifriction thrust ring 8 preferably formed of hard metal. The lower end of the guard sleeve 9 is screwed into the upper end of the jacket 1. The upper end of this sleeve is formed with the external downwardly pitched ratchet teeth 10 for engagement with the fishing tool in case the cable should break and the socket drop into the well and must be fished out. The sleeve 9 is split longitudinally into two halves as shown in Figure 2.

In assembly the thrust ring 8 is slipped over the free end of the cable 11 and said free end of the cable is then inserted into the nipple 6 and melted babbitt, or similar metal, is then poured into the socket 7 around the cable end and allowed to harden. The nipple 6 and the thrust ring 8 are then inserted into the jacket 1 and the sections of the sleeve 9 are assembled around the cable and screwed into the upper end of the jacket and thus completing the assembly.

When it is desired to remove the cable from the sheaves over which it operates, the socket may be detached from the pin 3 and the sleeve 9 unscrewed from the jacket 1 and removed from the cable and the jacket then detached leaving only the nipple 6 and thrust ring 8 on the cable end and these will readily pass through the sheaves and permit the removal of the cable.

In the embodiment shown in Figure 3 there is the outer jacket 1a which is formed of sections screwed together, the lower section 1b forming the box member.

Within the jacket 1a there is the tubular nipple 13 which has the internal bore 14. This bore has its upper end reduced in inside diameter forming the inside upwardly tapering shoulder 15. The nipple 13 has its upper end reduced in outside diameter forming the outside upwardly tapering shoulder 16 thereon.

Within the jacket 1a and fitted around the upper end of the nipple 13 there is a collar 17 whose lower end has the inside outwardly flared face 18 which rides on the shoulder 16. Between the upper end of the collar 17 and an inside annular shoulder 19 of the jacket 1a there is a thrust ring 8a preferably formed of hard material. In this embodiment the nipple 13a is split longitudinally in two halves as shown in Figure 3 and the upper end of the jacket 1a is extended upwardly and reduced in external diameter providing the tubular neck 20 which has the external ratchet teeth 10 for the purpose above stated.

In assembling this type of socket, the jacket 1a, with the box 1b removed, may be slipped over the end of the cable 11 and the thrust ring 8a, the collar 17 and the sections of the nipple 13a may then be assembled around said cable end and melted babbitt, or similar material 6a, may then be poured into the nipple 13 around the cable end and allowed to harden. The jacket 1a may then be lowered until the shoulder 19 rests on the thrust ring 8a and the socket member 1b may then be screwed into the lower end of the jacket 1a completing the assembly as shown in Figure 3.

When it is desired to detach the socket from the table preparatory to removing the table from the sheaves, the socket member 1b may be detached from the jacket 1a and said jacket 1a then moved upwardly on the cable to expose the parts 8a, 17 and 13. The two halves of the nipple 13 may then be detached from the babbitt 6a and the collar 17 and thrust ring 8a then slipped off over said babbitt leaving only the babbitt 6a on the end of the cable and this will readily pass through the sheaves.

When it is desired to reassemble the socket on to the cable, the jacket 1a with the box member 1b removed may be slipped over the cable end and the thrust ring 8a and collar 17 likewise slipped over the cable end and the two halves of the nipple 13 may then be fitted around the babbitt and the upper end of said nipple inserted into the collar 17 and the box member 1b may then be screwed into place in the lower end of the jacket 1a, thus completing the assembly.

The drawing and description disclose what are now considered to be preferred forms of the invention by way of illustration only while the broad principle of the invention will be defined by the appended claim.

What I claim is:

A cable socket comprising an outer jacket formed of sections screwed together, the lower section forming a box member, a longitudinally sectioned tubular nipple within the jacket whose lower end is extended into the box member, said nipple having an internal bore whose upper end is reduced in inside diameter forming an inside shoulder, the upper end of the nipple having its outside diameter reduced forming an external shoulder which is tapered, a collar within the jacket fitted around the reduced end of the nipple and whose lower end conforms to and abuts said external shoulder, said jacket having an inside, downwardly facing shoulder, a wear ring between the collar and the downwardly facing shoulder, a soft metal filling the nipple from end to end and molded about an end of a cable extended into the nipple, the diameter of said moulded metal being smaller than that of the jacket so that it will pass therethrough when the socket is taken apart.

FRED N. OSMUN.